United States Patent
Hopf

(10) Patent No.: US 8,460,492 B2
(45) Date of Patent: Jun. 11, 2013

(54) USE OF ADHESIVE TAPE COMPRISING A SPUNBONDED BACKING ONE-SIDEDLY COATED AT LEAST PARTIALLY WITH A PRESSURE-SENSITIVE ADHESVIE

(75) Inventor: Martin Hopf, Escheburg (DE)

(73) Assignee: tesa SE, Hamburg (DE)

( * ) Notice: Subject to any disclaimer, the term of this patent is extended or adjusted under 35 U.S.C. 154(b) by 861 days.

(21) Appl. No.: 11/997,269

(22) PCT Filed: Jul. 12, 2006

(86) PCT No.: PCT/EP2006/064122
§ 371 (c)(1), (2), (4) Date: Apr. 15, 2008

(87) PCT Pub. No.: WO2007/017334
PCT Pub. Date: Feb. 15, 2007

(65) Prior Publication Data
US 2008/0190544 A1 Aug. 14, 2008

(30) Foreign Application Priority Data

Aug. 5, 2005 (DE) .......................... 10 2005 037 663

(51) Int. Cl.
*B29C 65/04* (2006.01)
*B29C 65/08* (2006.01)
*B29C 65/50* (2006.01)

(52) U.S. Cl.
USPC .......................... 156/73.1; 156/274.4; 156/54

(58) Field of Classification Search
USPC .............. 156/53, 54, 73.1, 289, 308.2, 308.4, 156/324.4, 274.4
See application file for complete search history.

(56) References Cited

U.S. PATENT DOCUMENTS

| 3,062,683 A | * | 11/1962 | Kalleberg et al. | ............. 442/151 |
| 4,364,972 A | * | 12/1982 | Moon | ............................ 427/516 |
| 2002/0125037 A1 | * | 9/2002 | Kulper et al. | ............. 174/117 A |

FOREIGN PATENT DOCUMENTS

| DE | 19523494 C2 | 1/1997 |
| DE | 19523494 C3 | 1/1997 |
| DE | 29804431 U1 | 7/1998 |
| DE | 19746526 A1 | 4/1999 |
| DE | 10057479 A1 | 5/2002 |
| EP | 0384598 A1 * | 8/1990 |
| EP | 0932234 A1 | 7/1998 |
| EP | 0932234 B1 | 7/1998 |
| WO | 2005039006 A1 | 4/2005 |

OTHER PUBLICATIONS

English language Abstract and Machine Translation for EP 0932234 A1. Obtained by the examiner from European Patent Office website worldwide.espacenet.com. Date Unknown.*

* cited by examiner

*Primary Examiner* — Michael Tolin
(74) *Attorney, Agent, or Firm* — Norris McLaughlin & Marcus PA

(57) ABSTRACT

A method for thermally welding an adhesive tape to a polymeric substrate wherein the backing of the adhesive tape enters into a cured physical connection with the polymeric substrate is disclosed. The adhesive tape is comprises a spunbonded backing that is coated, at least partially, on one side with a pressure sensitive adhesive, preferably natural rubber or acrylate. The spunbonded backing can comprise polyester or polypropylene fibers that do not melt during the welding process, and may optionally include additives such as pigments, UV stabilizers and flame retardants.

23 Claims, 2 Drawing Sheets

USE OF ADHESIVE TAPE COMPRISING A SPUNBONDED BACKING ONE-SIDEDLY COATED AT LEAST PARTIALLY WITH A PRESSURE-SENSITIVE ADHESVIE

This application is a 371 application of PCT/EP2006/064122 filed Jul. 12, 2006, which claims priority to the German application DE 10 2005 037 663.0 filed Aug. 5, 2005.

The invention relates to the use of an adhesive tape comprising a spunbonded backing one-sidedly coated at least partially with a pressure-sensitive adhesive.

Adhesive tapes comprising as their backing a spunbonded are known. They are used, for example, for the bandaging of cable harnesses. DE 1 95 23 494 A1, for instance, describes a self-adhesive tape for bandaging cable harnesses, comprising a tapelike textile backing made of spunbonded. The web employed in accordance with the invention is a polypropylene spunbonded thermally consolidated and embossed by means of a calender, the embossing roll having an embossing area of 10% to 30%, preferably 19%. By virtue of its special design, the adhesive tape displays good hand tearing properties and good unwind properties in the context of its use for cable hardness bandaging.

DE 298 04 431 U likewise discloses the use of an adhesive tape having a backing of web material for bandaging cable harnesses, the spunbonded web proposed consisting of polyester.

The welding of the adhesive tapes to the substrate is not mentioned.

A multiplicity of different polymers are known which are used not only as lining parts in vehicle construction. As a consequence of the preparation process, the polymeric substrates are talc-wetted and/or contaminated with release agents, and, consequently, represent substrates on which commercially customary pressure-sensitive adhesives adhere only to a limited extent, and/or must be pretreated, which is costly and inconvenient.

Mechanical fastening elements such as clips or cable ties are known for the permanent fixing of components such as cable strands, allowing rational routing of cable harnesses, independently of polymeric substrates. Disadvantages are encountered in the field of noise suppression and systems costs.

Likewise known is the process of physically joining two polymeric substrates with ultrasound exposure and pressure.

EP 0 932 234 A1 describes a method for fastening a component on a support material. In that case the component is fastened with a fastening means that has a contact area, the contact area being composed of a material which can be welded thermally to the support material, and the fastening means being fastened by thermal welding of the contact area to the support material. As a consequence of this, separate mounting elements or connecting means become superfluous. The term "component" refers to relatively small mounted parts such as sensors, lights or electrical lines.

The thermally welded area can be placed in the form of a ring around the component, for example, so that the component has all-round securement against slipping.

The invention affords a particular advantage for the fastening of electrical or fluidic lines. In that case the fastening means is appropriately a film, which is placed onto lines which are routed on the support material, and then is thermally welded on both sides of the line, in the manner of a sticking plaster.

In a further preferred embodiment a cable tie with an additional contact area is used, this additional contact area being weldable to the support material.

Support material, cable tie and/or film are preferably made of polyethylene or polypropylene, the materials which are welded thermally to one another preferably being the same.

The term "film" also refers to two-dimensional structures in the wider sense, such as, for example, nonwoven webs, woven fabrics or thin-layered sheets.

DE 197 46 526 A1 discloses a cable harness which can be produced at reduced cost and complexity. The cable harness is formed from a sheet and from the lines which are bundled by means of said sheet; either only the lines of the main trunk are bundled, using a sheet oriented substantially parallel to them, so that the sheet is folded around the lines transversely with respect to the lines, and exhibits marginal regions which lie one against another and protruding in the radial direction, these marginal regions being joined to one another, or the lines both of the main trunk and of the branch are bundled using a sheet which is oriented in each case substantially parallel to the lines, the sheet employed being configured in accordance with the routing scheme and being considerably wider than the respective lines disposed lying adjacent to one another.

A sheet in this case is a two-dimensional, inherently homogeneous, flexible structure, including paper and sheetlike textile structures made of natural and synthetic fibers such as nonwoven webs and woven fabrics.

The marginal regions can be welded or adhesively bonded.

Ultrasonic welding is a method of joining plastics. Fundamentally it is possible to weld only thermoplastics. In principle, however, metals as well can be welded, a fact which is also employed, for example, in electrical engineering in connection with the wiring of microchips. As with all other welding techniques, the material must be melted by supplying of heat at the weld location. In the case of ultrasonic welding, this heat is generated by means of high-frequency mechanical vibration. The primary feature of this technique is that the heat needed for welding comes about between the components by molecular friction and interfacial friction in the components. Consequently, ultrasonic welding makes up part of the frictional welding group.

The ultrasonic welding apparatus is composed essentially of the following assemblies:
generator
oscillator (sonotrode)
anvil The ultrasound frequency is produced by means of the generator. The generator converts the mains voltage into a high voltage and high frequency. A shielded cable transfers the electrical energy to an ultrasound transducer, referred to as the converter. The converter operates in accordance with the piezoelectric effect, where the property of certain crystals to expand and contract when an alternating electrical field is applied is exploited. This produces mechanical vibrations which by way of an amplitude transformation section are transmitted to the sonotrode (referred to as the welding horn). The amplitude of the oscillation can be influenced in its magnitude through the amplitude transformation section. The vibrations are transmitted under pressure of 2 to 5 N/mm² to the workpiece clamped between the sonotrode and an anvil; molecular friction and interfacial friction generate the heat required for plasticification. As a result of the local temperature, the plastic begins to soften, and the damping coefficient goes up. The increase in the damping factor leads to further heat generation, which ensures the effect of a self-accelerating reaction. This process is characterized by very short welding times and often, consequently, high economy.

After cooling, the welded connection is strong.

Because the sonotrode is permanently subject to ultrasonic vibrations, the requirements imposed on the material are very high. Usually, therefore, carbide-coated titanium is used.

High-frequency welding is a compression welding process under the action of heat, which develops on the basis of the ohmic losses in the parts that are to be joined. The two variants associated with the application of HF current in welding are the inductive and conductive introduction of energy. In the case of conductive HF welding, the energy is introduced via current rails or sliding contacts, while in the case of the inductive variant this occurs through an induction coil lying above the parts that are to be joined. The high-frequency alternating current flowing at the parts to be joined as a result of electrodynamic effects causes the connection site to heat up, and the parts are joined form-fittingly to one another by application of force. The thermoplastics for welding must possess a dielectric loss factor d of >0.01.

At the present time, HF welding with inductive introduction of energy is employed in industry primarily for the production of longitudinally welded pipes.

As well as the aforementioned HF welding and ultrasonic welding techniques, the thermal welding processes include, among others, hot-air welding and heated-rod roller welding.

It is an object of the present invention to provide an article that can be welded thermally to a polymeric substrate and in that situation is able more particularly to establish a secure bond even to surfaces carrying release agent.

This object is achieved by means of the use of an adhesive tape as specified in the main claim. The dependent claims provide advantageous developments of the subject matter of the invention.

The invention accordingly provides for the use of an adhesive tape comprising a spunbonded backing one-sidedly coated at least partially with a pressure-sensitive adhesive, in a thermal welding operation such as HF welding or ultrasonic welding on a polymeric substrate, in which the backing of the adhesive tape enters into a cured physical connection with the polymeric substrate.

In a first advantageous embodiment the adhesive tape has as its backing a spunbonded of polyester, more particularly of polyester fibers and co-polyester fibers, which more preferably have been surface-consolidated and/or embossed by means of a calender.

The fraction of polyester fibers in the backing is, in a further advantageous embodiment of the invention, more than 70% by weight, preferably more than 80% by weight, and the fraction of co-polyester fibers is less than 30% by weight, preferably less than 20% by weight.

The web advantageously has the following combination of properties:
  web weight: 30 to 200 g/m², preferably 70 to 100 g/m², more preferably 85 g/m²
  thickness: 250 μm to 800 μm, preferably 500 μm to 600 μm, more preferably 560 μm
  breaking elongation: 17% to 87%, preferably 25% to 40%, more preferably 32%
  machine-direction breaking strength: 100 N/5 cm to 400 N/5 cm, more particularly 200 N/5 cm
  cross-direction breaking strength: 80 N/5 cm to 200 N/5 cm, more particularly 130 N/5 cm.

The yarn count, yarn thickness or the titer of a yarn, a fiber or a filament is measured in mass per unit length. The yarn count says nothing about the strength of the yarn or its volume.

A high yarn count denotes a smaller mass/length ratio, a high titer a larger mass/length ratio.

The yarn count is measured internationally in tex (1 tex corresponds to 1 gram per km).

The linear density of the fibers, in a further advantageous embodiment of the invention, is 1 to 4.5 dtex, preferably 2.2 dtex.

The calender employed for the embossing of the spunbonded web is preferably a two-roll calender composed of at least one plain roll and/or engraved roll. This engraved roll preferably has an embossing area of 10% to 30%, preferably 15%.

The recess depth in the embossing of the backing of the invention, resulting from the calendering, is dependent on a number of factors during the calendering operation. A decisive part is played here by the temperature of the embossing roll, the pressure exerted on the web in the nip between the rolls, and the speed at which the web passes through the roll nip.

In an alternative embodiment of the invention, the backing is formed by a polypropylene spunbonded which can likewise be thermally consolidated and embossed by means of a calender.

The web advantageously has the following combination of properties:
  web weight: 30 to 200 g/m², preferably 70 to 100 g/m², more preferably 85 g/m²
  thickness: 250 μm to 800 μm, preferably 500 μm to 600 μm, more preferably 560 μm
  breaking elongation: 17% to 87%, preferably 25% to 40%, more preferably 32%
  machine-direction breaking strength: 100 N/5 cm to 400 N/5 cm, more particularly 200 N/5 cm
  cross-direction breaking strength: 80 N/5 cm to 200 N/5 cm, more particularly 130 N/5 cm.

The linear density of the web is 2 dtex to 7 dtex, preferably 4 dtex.

The calender employed is preferably at two-roll calender composed of a plain roll and an engraved roll. The engraved roll has an embossing area of 10% to 30%, preferably 19%. The recess depth in the embossing of the backing of the invention, resulting from the calendering, is dependent on a number of factors during the calendering operation. A decisive part is played here by the temperature of the embossing roll, the pressure exerted on the web in the nip between the rolls, and the speed at which the web passes through the roll nip. The following parameters prove particularly advantageous for optimum configuration of the spunbonded web for further processing:
Embossing roll temperature: 150° C.
Linear pressure: 75 daN/cm
Running speed: 50 m/min In order to give the adhesive tape properties optimized for the specific end use, further additives may be added to the web backings in the course of the production operation. For instance, appropriate color pigments can be used to achieve a preferred color in the web backings. Commercially customary UV stabilizers increase the stability of the adhesive tape with respect to the intense UV irradiation due, for example, to the sun. In the context of the use of the adhesive tape for bandaging cable harnesses, a quality deserving of particular emphasis is that the adhesive tape has been made flame-retardant through the addition, preferably, of ammonium polyphosphate.

With further preference the spunbonded has been given a white, or at least pale, coloration. The melting fiber components in the web fuse to the polymeric substrate in such a way that an optical evaluation can be made as to the quality of welding.

The properties of the spunbonded web backing are measured in accordance with DIN-EN 29073-3.

Metallic particles such as metal powders may be admixed to the spunbonded web backing, in order to allow inductive development of heat in the web during the welding operation.

The spunbonded web is preferably one-sidedly coated at least partially with a natural-rubber-based or acrylate-based, pressure-sensitive adhesive, the adhesive having been admixed with fibers which do not melt in a thermal welding process.

Coating may take place in the form of one or more stripes, but is preferably complete.

Coating takes place on the basis of known techniques such as spread-coating or laminating operation.

The adhesive is crosslinked physically, thermally, chemically and/or by EBC, preferably chemically.

A suitable adhesive is an acrylate composition with long molecular chains, which has a K value of at least 70, more particularly of 75 (measured in each case in 1% strength by weight solution in toluene, 25° C.).

The K value here is determined more particularly in analogy to DIN 53 726.

A specific description may be given, for example, of the following adhesive, which is outstandingly suitable.

Polymer 1

A 200 L reactor conventional for free-radical polymerizations is charged with 2400 g of acrylic acid, 64 kg of 2-ethylhexyl acrylate, 6.4 kg of N-isopropylacrylamide, and 53.3 kg of acetone/isopropanol (95:5). After nitrogen gas has been passed through the reactor for 45 minutes with stirring, the reactor is heated to 58° C. and 40 g of 2,2'-azoisobutyronitrile (AIBN) are added. Subsequently the external heating bath is heated to 75° C. and the reaction is carried out constantly at this external temperature. After a reaction time of 1 h a further 40 g of AIBN are added. After 5 h and 10 h the batch is diluted with 15 kg each time of acetone/isopropanol (95:5). After 6 and 8 h, 100 g portions each time of dicyclohexyl peroxydicarbonate (Perkadox 16®, Akzo Nobel) are added, in solution in each case in 800 g of acetone. The reaction is terminated after a reaction time of 24 h and the batch is cooled to room temperature.

Pressure-Sensitive Acrylate Adhesive 1

Polymer 1 is diluted down to a solids content of 30% using special-boiling-point spirit 60/95. Subsequently 25% by weight (based on the proportion of polymer 1) of rosin (glyceryl ester) Foral™ 85 (Eastman Chemical) and 0.3% by weight (based on the proportion of polymer 1) of aluminum (III) acetylacetonate (in the form of a 3% strength solution in isopropanol) are stirred in and dissolved completely.

Subsequently the adhesive is coated from solution onto the substrate, using a comma bar, for example, and dried at 120° C. for 10 minutes.

The preferably transparent adhesive is reinforced by mineral fibers such as, preferably, glass fibers, carbon fibers and/or polymeric fibers, but more particularly glass fibers. The fibers are added to the adhesive at 2% to 5% by weight, preferably 3% by weight.

The fibers are composed preferably of polyvinyl alcohol and preferably have the following parameters:
  thickness: $\geqq 3$ μm, preferably 5 μm to 15 μm, with particular preference 10±1 μm,
  length: $\geqq 4$ mm, preferably 4 mm to 10 mm, with particular preference 6±1 mm,
  density: 2.5 g/m$^3$ The total thickness of the adhesive layer is 20 to 200 μm, preferably 50 μm, which represents a good balance between insulation, on the one hand, and costs, on the other.

The long molecular chains in combination with the fibers unchanging in the course of the welding process reduce, during welding, the uncontrolled running of the self-adhesive composition from the welding zone, and avoid the cost and complexity of cleaning on the sonotrode. At the same time the fibers strengthen the physical bond which comes about after welding.

Under the pressure and ultrasound introduced for welding, the fibers do not melt, and so a brief application of ultrasound does not result in the running of the self-adhesive composition.

In order to reduce the unwind forces of the adhesive tape from the completed roll, or to avoid release paper, the uncoated reverse of the web backing can have been given an antiadhesive treatment.

On the basis of its chemical composition and its specific fiber blend, a spunbonded web of polyester has outstanding properties, with the consequence that, in its capacity as a backing in an adhesive tape, it is able to enter into an outstanding physical connection with any of a very wide variety of polymeric substrates when it is welded thermoplastically, under ultrasound and pressure, for example, and subsequently cures.

Owing to the chemical composition, spunbonded webs of polypropylene can in fact only be welded thermally to chemically similar polymeric substrates, viz. polyolefinic substrates, and yet this leads to similarly outstanding results as for the polyester spunbondeds.

Furthermore, spunbonded webs have higher breaking strengths in machine and cross direction than comparable nonwoven webs. Consequently, in its preferred end use as a fastening loop, the adhesive tape means that the components stand up not only under the loading in driven operation of vehicles but also, especially, in the edge region of the weld seam.

Furthermore, the preferred pale color of the spunbonded in the region of the weld seam shows, by way of the change in coloration, the quality of the physical union. In the course of welding, the fibers of the backing material melt, and also the typically dark or black-colored substrate melts (provided it is a thermoplastic substrate). Diffusion effects and mixing effects occur, with the consequence that the melted mass of the backing material combines with the mass of the substrate. This leads to a change in color at the weld location; the weld seam that forms appears charcoal in color. If, in contrast, the thermoplastic substrate is pale, it is appropriate to give the spunbonded a black finish. In this case the welding operation results in a gray weld seam.

Features of an outstanding weld seam are that it has a sufficient width over the desired length and that it has undergone an uninterrupted change in color to dark or pale (a different color, that is, than the spunbonded web or than the substrate). Consequently a visual control is apparent directly in the course of welding.

Furthermore, on account of its preferred embossing, the adhesive tape has an outstanding damping quality. This can be attributed to the special construction of the embossed backing, with highly densified flat fractions and less heavily densified, and particularly flexible, fractions. Accordingly, in its end use as a fastening loop, the adhesive tape combines not only outstanding tensile properties but also particular damping properties.

The adhesive tape is used for thermal welding such as HF welding or ultrasonic welding of components, more particularly for the welding of cables or cable harnesses in the automobile sector.

In this context, the component is surrounded completely or partially by the adhesive tape, so that the component is in contact with the adhesive coating. The component may be fastened on the contact area, on which the adhesive tape, ultimately, is fixed by the welding operation, through the adhesive coating of the adhesive tape itself.

The contact area is composed of a material which can be welded thermally to the backing material, and the adhesive tape is fastened by thermal welding of the contact area to said material. As a result, at the same time, the component is fixed to the contact area.

Since thermal welding is also possible over a certain distance, the manufacturing accessibility of the component is less critical, which makes it easier to carry out the process using automatic welding equipment.

The component—by which is meant here, more particularly, the cable harness—is preferably surrounded completely radially by the adhesive tape, so that the component has all-round securement against slipping. Furthermore, the adhesive tape may in this way form a protruding pennant— for example, by the open ends of the adhesive tape being pressed with the adhesive side against one another. This pennant can subsequently be welded.

The particular advantage of thermal welding is that there is no need for separate fastening means or connectors. On the other hand, a sufficiently large welding area for secure fastening is available; at the same time, however, the risk of thermal and/or mechanical damage to the parts that are to be welded can be reduced, since these parts are at a sufficient distance from the welding area.

The particular feature of the process of the invention is that the adhesive tape unites two completely different joining techniques: on the side facing the substrate (roof lining or door lining, for example), a welded connection brought about preferably by application of ultrasound, and on the other side, the side facing the mounted component (cable harness, for example), a join by means of pressure-sensitive adhesive.

This combination was hitherto impossible, because pressure-sensitive adhesives do not withstand the introduction of high temperatures; the majority of them underwent uncontrolled running and suffered a loss of tack as a result of progressive polymerization and/or solvent loss. Although at first it appeared to be possible to alleviate this problem sufficiently, by switching to a supply of energy through introduction of ultrasound, on the basis that this kind of energy introduction, surprisingly, is able to concentrate the zone of thermal influence precisely on the area to be welded it nevertheless then failed on account of the fact that the exertion of pressure by the sonotrode, which is needed for the introduction of the mechanical vibration energy, likewise imposed pressure on the adhesive surface connected mechanically in series with it, and pressed out the adhesive at the sides.

Only the inventively proposed long molecular chains in combination with the preferred fibers unchanging in the course of the welding process, in the adhesive, reduce the uncontrolled running of the self-adhesive composition from the welding zone in the course of welding, and avoid the cost and complexity of cleaning on the sonotrode. At the same time the fibers reinforce the physical bond which comes about after welding.

The invention is elucidated in more detail by reference to the figures that are described below, without any wish that the invention should be restricted unnecessarily.

Figure 1:
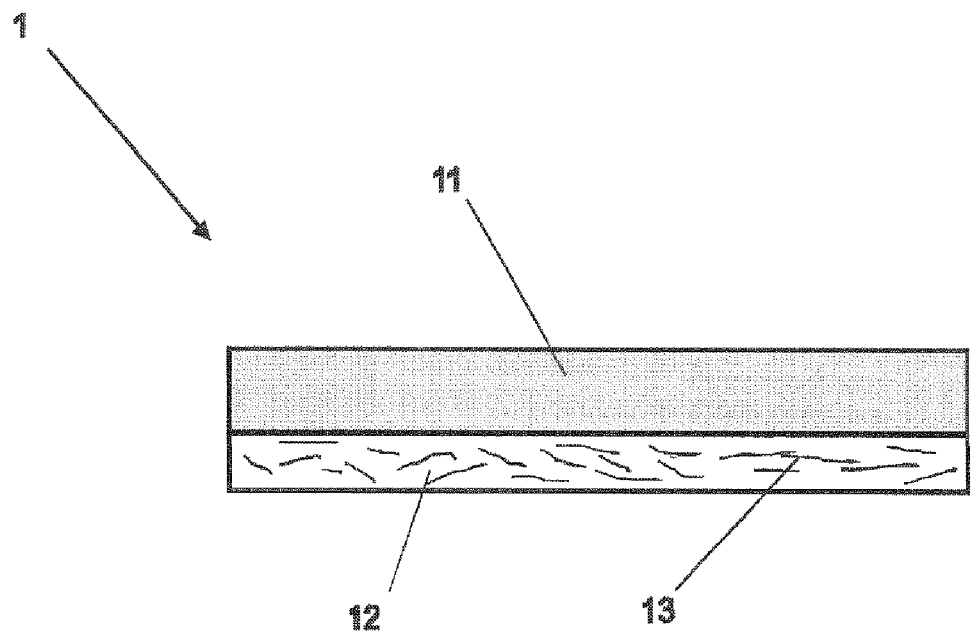
FIG. 1 shows the adhesive tape in lateral section.

FIG. 1 shows the adhesive tape 1 in lateral section. The adhesive tape 1 has a spunbonded backing 11 provided on its underside with an adhesive coating 12. Distributed within the adhesive coating 12 there are glass fibers 13.

Figure 2:
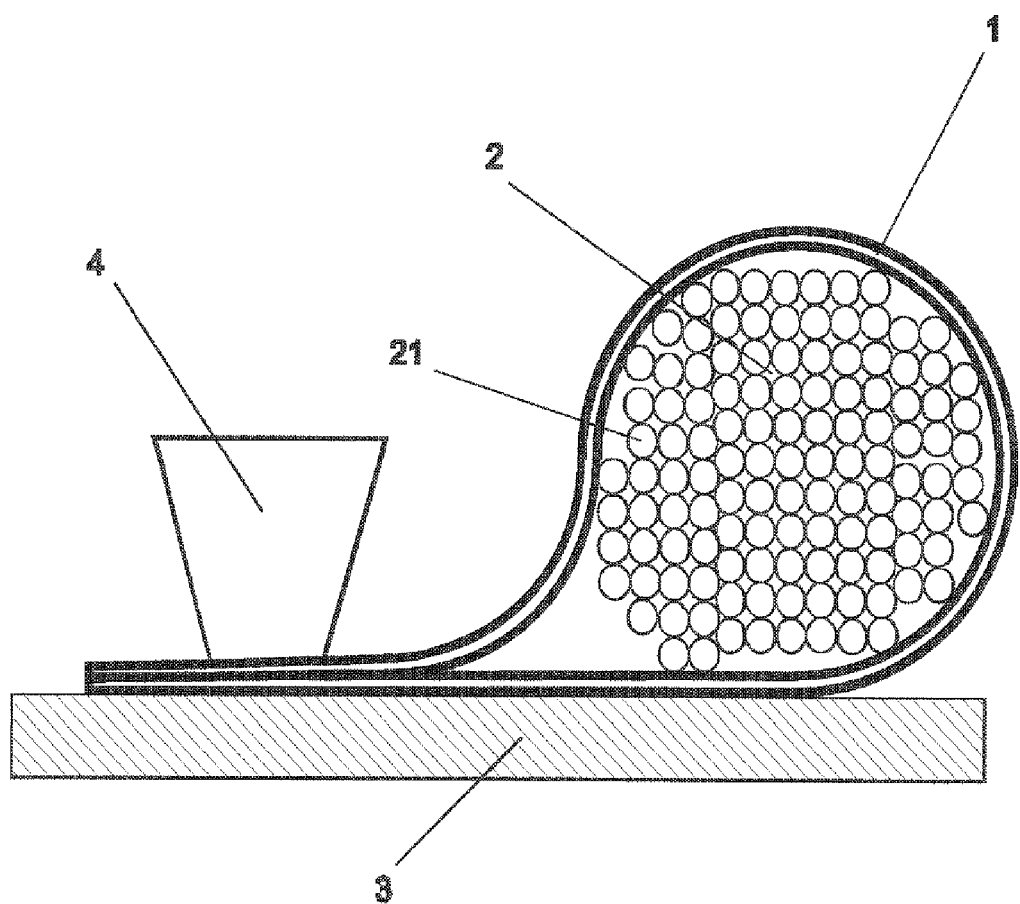
FIG. 2 shows a cross section through a cable harness radially wrapped by the adhesive tape of the invention, the adhesive tape being thermally welded to a substrate, i.e., used according to the invention.

FIG. 2 depicts a cross section through a cable harness 2 which is radially wrapped by the adhesive tape 1, the adhesive tape 1 having been thermally welded to a substrate 3. The cable harness 2 comprises a multiplicity of individual cables 21, which are fully encircled by the adhesive tape 1, in such a way that the adhesive coating 12 of the adhesive tape 1 is located inwardly. The adhesive coating, then, is in contact with the cables 21.

The ends of the adhesive tape 1 are bonded to one another and form a so-called flag 5. This flag 5 is welded thermally to the desired substrate 3, such as the roof lining of a motor vehicle, for example, more particularly by means of ultrasound. For this purpose the sonotrode 4 is placed onto the pennant 5 with pressure, and supplies the energy needed for the welding operation.

Since the roof liner is a lining part of a motor vehicle, the welding takes place on the side facing the vehicle body. Since the fastening is not visible from the interior of the vehicle, visual impairment to the fastening can be accepted.

The materials of which the adhesive tape backing 11 and also the substrate 3 are made are selected in relation to one another in such a way that they can be welded thermally to one another. Examples of possible suitable materials include polyethylene, polypropylene, polyamide or polyvinyl chloride. Preferably the same material is used, although on the basis of other manufacturing considerations it may be appropriate to utilize different materials.

The invention claimed is:

1. A method comprising thermally welding adhesive tape on a polymeric substrate, wherein the adhesive tape comprises a spunbonded backing coated at least partially on one side with a pressure-sensitive adhesive, the backing of the adhesive tape enters into a cured physical connection with the polymeric substrate, wherein the adhesive is an acrylate composition with long molecular chains and having a K value of at least 70, and comprises fibers that do not melt in the thermal welding process, wherein the thermal welding process is selected from the group consisting of high-frequency (HF) and ultrasonic welding processes.

2. The method of claim 1, wherein the spunbonded backing comprises polyester.

3. The method of claim 2 wherein the spunbonded backing comprises polyester and/or co-polyester fibers.

4. The method of claim 2, wherein polyester spunbonded backing has a web weight of 30 to 200 g/m2; a thickness of 250 µm to 800 µm; a breaking elongation of 17% to 87%; a machine-direction breaking strength of 100 N/5 cm to 400 N/5 cm; and a cross-direction breaking strength of 80 N/5 cm to 200 N/5 cm.

5. The method of claim 4 wherein the polyester spunbonded backing has a web weight of 70 to 100 g/m².

6. The method of claim 4 wherein the polyester spunbonded backing has a thickness of 500 to 600 μm.

7. The method of claim 4 wherein the polyester spunbonded backing has a breaking elongation of 25% to 40%.

8. The method of claim 1, comprising polypropylene spunbonded backing which has been thermally consolidated and embossed by means of a calender.

9. The method of claim 4, wherein the polypropylene spunbonded comprises a web weight of 30 to 200 g/m2; a thickness of 250 μm to 800 μm; a breaking elongation of 17% to 87; a machine-direction breaking strength of 100 N/5 cm to 400 N/5 cm; and a cross-direction breaking strength of 80 N/5 cm to 200 N/5 cm.

10. The method of claim 9 wherein the polypropylene spunbonded backing has a web weight of 70 to 100 g/m².

11. The method of claim 9 wherein the polypropylene spunbonded backing has a thickness of 500 to 600 μm.

12. The method of claim 9 wherein the polypropylene spunbonded backing has a breaking elongation of 25% to 40%.

13. The method of claim 1 wherein the spunbonded backing comprises one or more additives selected from the group consisting of pigments, UV stabilizers, and flame retardants.

14. The method of claim 13 wherein the spunbonded backing has been given a pale or white coloration through the addition of color pigments.

15. The method of claim 1 wherein the fibers are selected from the group consisting of glass fibers, carbon fibers, polymeric fibers, and mixtures thereof.

16. The method of claim 1 wherein the fibers are present in the adhesive at 2% to 5% by weight.

17. The method of claim 1 wherein the fibers comprise polyvinyl alcohol and have a thickness of $\geq 3$ μm; a length of $\geq 4$ mm; and a density of 2.5 g/cm³.

18. The method of claim 17 wherein the fibers have a thickness of 5 to 15 μm.

19. The method of claim 17 wherein the fibers have a length of 4 to 10 mm.

20. The method of claim 1 wherein the adhesive coating has a total thickness of 20 to 200 μm.

21. The method of claim 1 wherein the adhesive coating is transparent.

22. The method of claim 1 wherein a side opposite the adhesive coating of the spunbonded backing has been given an antiadhesive treatment.

23. The method of claim 1 wherein a cable harness in a motor vehicle is formed by adhering the pressure sensitive adhesive to cables followed by thermally welding the cables to the polymeric substrate.

* * * * *